Figure 4:
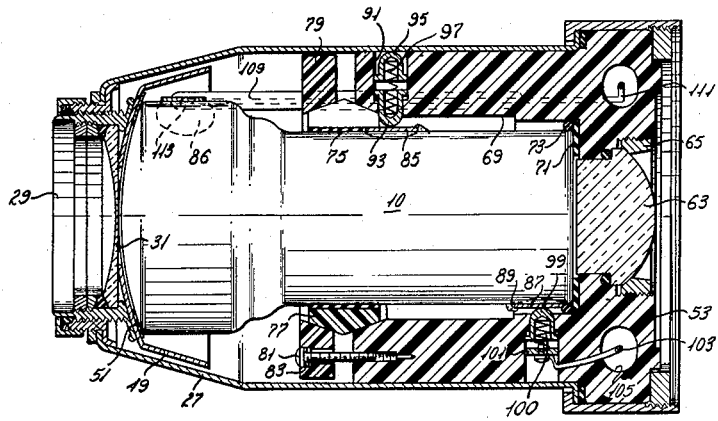

Sept. 27, 1960    A. A. C. BAYLE    2,954,478
RADIANT ENERGY SENSITIVE DEVICES
Filed Dec. 27, 1954    3 Sheets-Sheet 1
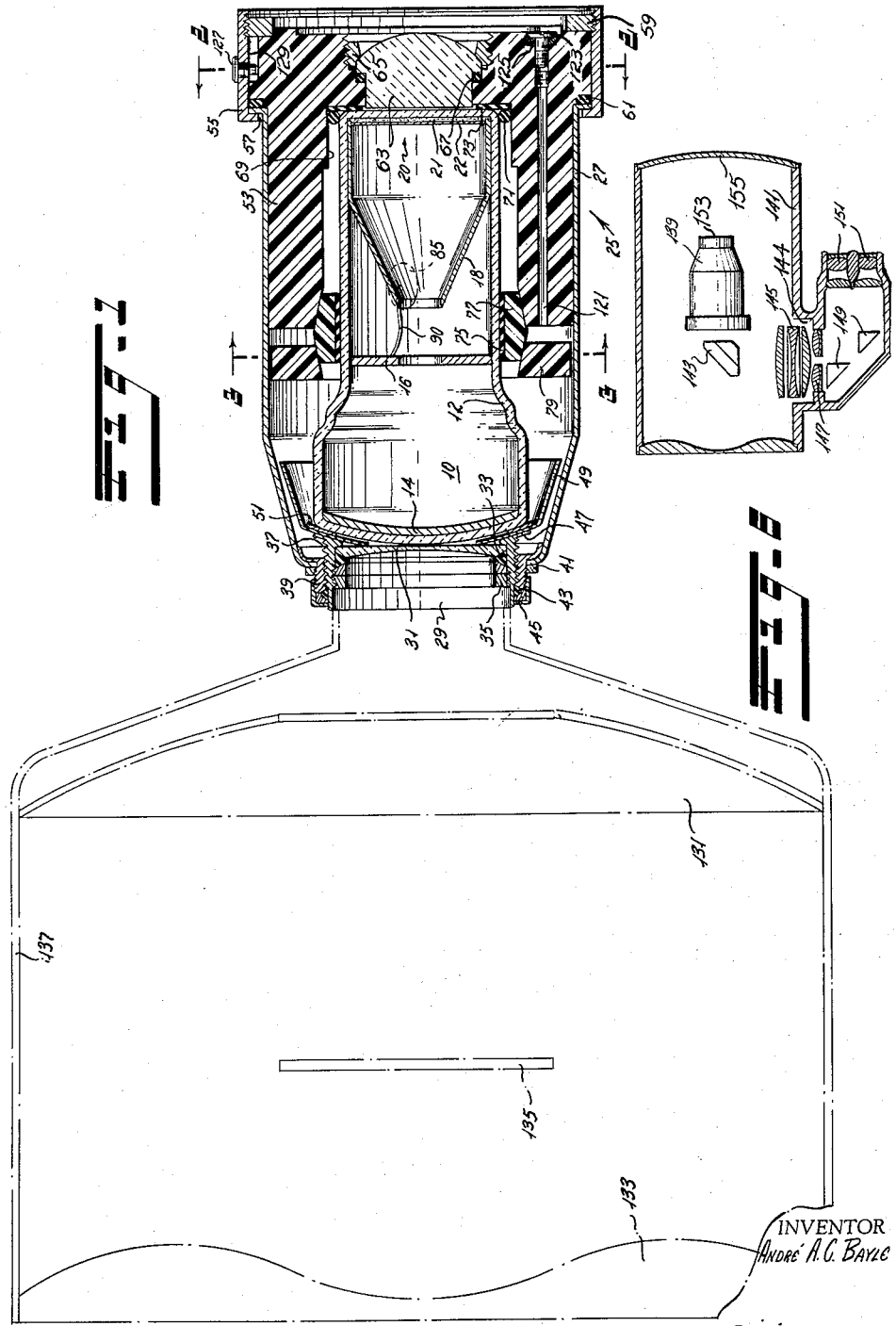
INVENTOR
ANDRÉ A. C. BAYLE
BY Strauch, Nolan & Diggins
ATTORNEYS

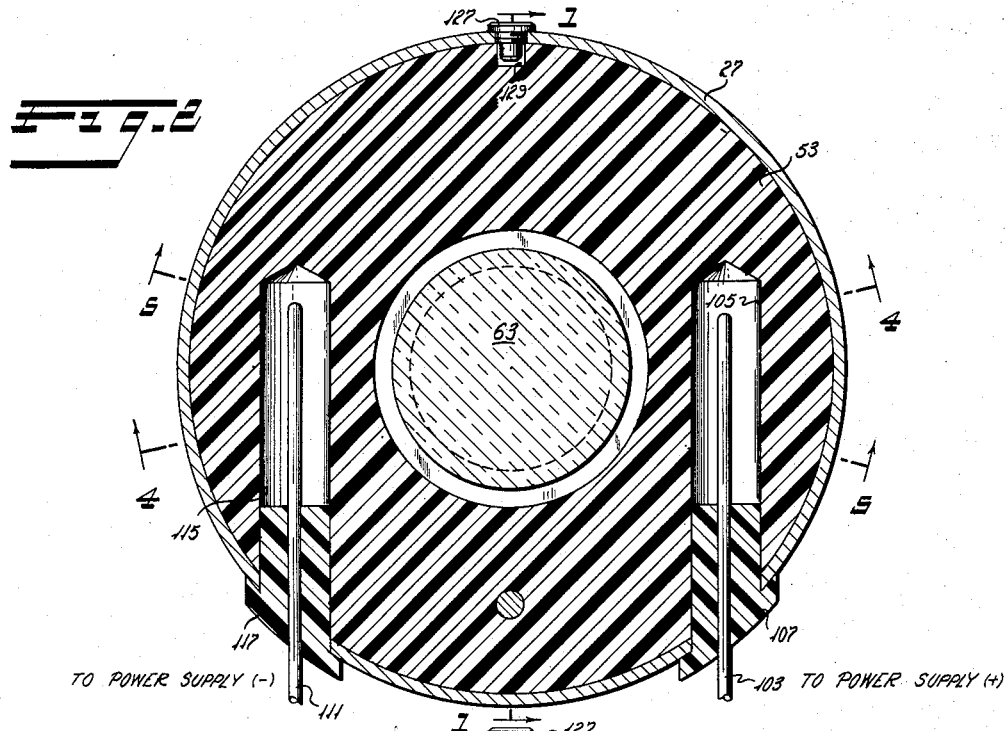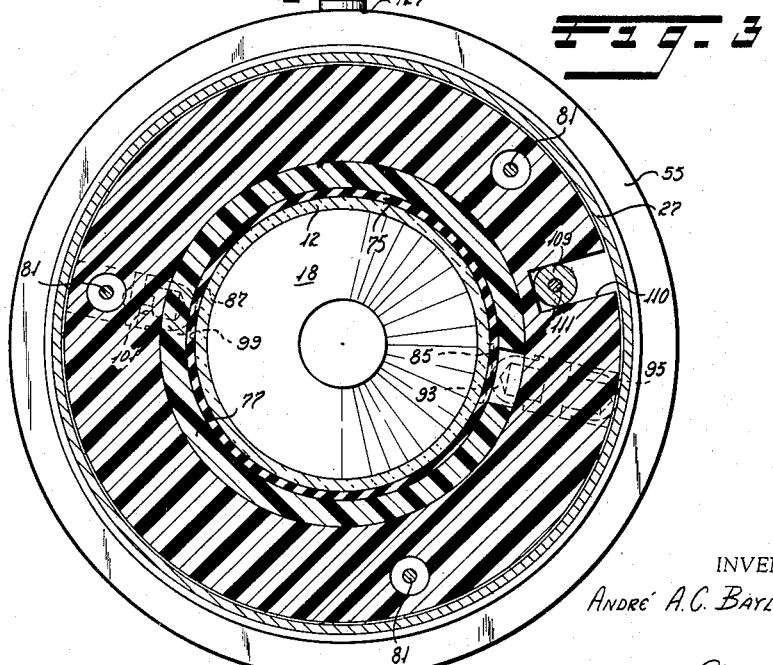

United States Patent Office 2,954,478
Patented Sept. 27, 1960

2,954,478
RADIANT ENERGY SENSITIVE DEVICES

André A. C. Bayle, Paris, France

Filed Dec. 27, 1954, Ser. No. 477,895

5 Claims. (Cl. 250—217)

This invention relates to radiant energy sensitive devices and more particularly to electro-optical apparatus for image conversion and intensification.

Image tubes which convert optical images of objects or fields of view to an electron stream of density varying correspondingly to the intensity of illumination from point to point of the optical image and which then again convert the electron stream into optical rays for visual or photographic observation, are well known and in common use perhaps most widely for observation of infrared illuminated fields as in the familiar "sniperscope," which carries its own infra-red source for illuminating the field to be viewed through the image convertor. Image tubes of this type may be made sensitive to other desired radiant energy wavelength band by proper selection of photocathode materials or by use of composite photocathodes. Such tubes find utility not only in conversion of optical images from one wavelength band to another, but also in intensification of images otherwise too dim for good visibility and in image enlargement.

It is the primary purpose of the present invention to obtain improved operation of tubes of the type described, particularly as regards image resolution and image stability, and to provide novel power supply, optical system and tube housing arrangements for effecting such improved operation. While the invention as herein disclosed is directed primarily to radiant energy sensitive devices of the image conversion type described, in certain of its aspects it is applicable to image tubes, photo tubes, photomultipliers and other radiant energy sensitive devices generally, as will be apparent to those skilled in the art.

A principal object of the invention is the provision of new and improved image convertor assemblies capable of providing optimum image resolution and image stability.

It is also an object of this invention to provide novel image convertor assemblies in which power supply voltages higher than those heretofore considered feasible are utilized and improved image resolution and stability thus obtained, and to provide novel means permitting the operation of image tubes at such higher voltages.

Another object of the invention is the provision of new and improved housings for electro-optical and similar tubes capable of preventing corona about the tube and its electrical connections even when operated at high supply voltages.

Still another object is the provision of new and improved electro-optical tube housings wherein the tube is enclosed and hermetically sealed in the housing in an atmosphere resistant to corona effects.

A further object of this invention is to provide novel electro-optical tube housings including optical lens elements mounted and sealed in the housing walls in optical alignment with the tube therein, and also to provide such tube housings wherein at least one of the lens mounts is adjustable to accommodate tubes of different lengths.

Another object is to provide new and improved electro-optical tube housings wherein the tube is shielded against mechanical shock, and also to provide tube housings having novel electrical connection means for providing electrical connection to the tube electrodes.

It is also an object of this invention to provide a novel image convertor system utilizing a Schmidt objective with the tube positioned between elements thereof for purposes of compactness.

Figure 5:
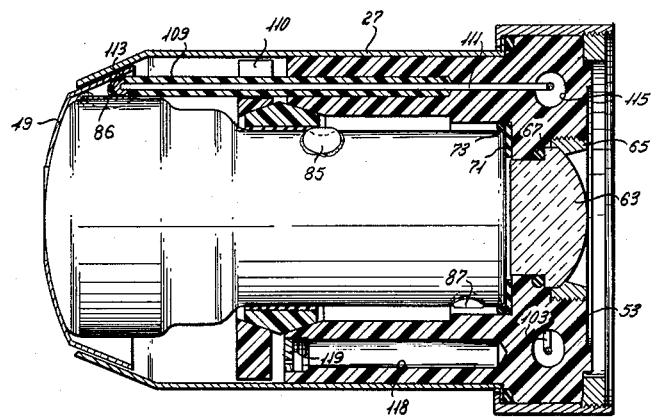

These and other objects, features and advantages of the present invention will become more fully apparent by reference to the appended claims and the following detailed description when read in conjunction with the accompanying drawings, wherein:

Figure 1 is a diametral sectional view taken substantially on the line 1—1 of Figure 2, and illustrates an image convertor assembly including a conventional Schmidt objective shown in phantom lines in the figure;

Figures 2 and 3 are sectional views taken on the lines 2—2 and 3—3, respectively, of Figure 1;

Figures 4 and 5 are sectional views taken on the lines 4—4 and 5—5, respectively of Figure 2; and Figure 6 is a sectional view of an image convertor assembly including an image convertor tube and tube housing mounted between the mirror and corrector plate of a modified Schmidt objective.

With continued reference to the drawings, wherein like reference numerals are used throughout to designate like elements, Figure 1 illustrates electro-optical apparatus in accordance with the invention, and shows in phantom lines a conventional Schmidt objective suitable for use with this apparatus.

An image converter tube generally designated by reference numeral 10 in Figure 1 is of electrostatic type and as shown has conventional photocathode, focusing electrode and target screen structure. Thus, the tube 10 may comprise a glass envelope 12 having at one end thereof a photocathode 14 of material photoemissive to the particular radiant energy wavelength band to which tube sensitivity is desired; if the tube is to be sensitive to infrared, for example, a photocathode of cesium oxide-silver oxide may be used. First and second electrodes 16 and 18 are positioned intermediate the ends of the tube and together constitute an electron lens for focusing and accelerating the photoemission from photocathode 14 onto a target screen 20 which as shown is made up of a layer 21 of material such as zinc sulfide fluorescent to electron bombardment and having a conductive coating 22 of evaporated aluminum or the like.

In operation, the photocathode 14 normally is connected to a source of negative potential, electrode 16 connected to ground, and electrode 18 and target screen 20 both connected to a source of positive potential. The photoemission from photocathode 14 due to radiant energy incident thereon is electrostatically focused by the electron lens formed by electrodes 16 and 18, and accelerated onto target screen 20 by the high potential differences between the target screen, photocathode 14 and electrode 16. Since the photoemission is patterned in intensity correspondingly to the intensity of radiant energy incident on the photocathode, and the electron "image" thus formed remains intact in passing through the focusing electrodes 16 and 18, on impingement of the photoelectron stream on target screen 20 a visible image is formed in the fluorescent material 21 thereof which is a substantially exact replica of the radiant energy image on the photocathode. While the fluorescent image does not differ from that incident on the photocathode in intensity pattern, it does differ therefrom either in radiant energy wavelength band, size or overall intensity, the particular difference obtained depending on the requirements of the particular application.

Image convertor, intensifier and enlarging tubes of the type just described and of other electrostatic focusing types having focusing electrodes of different configurations and in some cases more or fewer electrodes, have in the past normally been operated with supply voltages such as to provide approximately 5,000 to 10,000 volts potential difference between the photocathode and target screen, and tube operation with up to 20,000 volts has been reported. As would be expected, the greater the supply voltage, the greater is the intensity of the image reproduced in the fluorescent target screen.

I have found that if supply voltages substantially higher than those previously considered feasible are used there results not only the expected increase in image intensity, but also a marked improvement in image resolution and image stability. This despite the fact that in theory image resolution and stability should not vary greatly with operating voltage. In practice, however, with supply voltages of 5,000 to 20,000 volts as previously used only a fraction of the theoretically obtainable image resolution actually is realized. By increasing the supply voltage to over 35,000 volts and preferably to about 40,000 volts, image resolution actually obtained has been found to very closely approach the maximum theoretically available from image convertor tubes of this type, and at the same time image stability is greatly improved.

This marked difference between theoretical and actual image resolution in prior image convertors is believed due to the fact that at the operating voltages (20,000 volts or less) used therewith, undesirable charges accumulate on the walls of the tube and cause distortion of the electrostatic focusing and acceleration fields within the tube, thus adversely affecting tube definition. Since the density of such charges varies with time, their presence also leads to instability of the image, further detracting from tube definition. The use of higher operating voltages in accordance with the present invention minimizes such undesirable charge accumulation on the tube walls and thereby minimizes the deleterious effects on image resolution attributable to the presence of these charges. It thus is possible to obtain the high definition which these tubes are in theory capable of providing but which in practice has heretofore been unattainable.

For example, a typical image convertor tube of the type illustrated in Figure 1 operated with a 20,000 volt power supply as heretofore commonly used, normally provides image resolution of about 126 lines per cm.; the same tube housed and operated at 40,000 volts in accordance with the invention provides image resolution of about 260 lines per cm. As is apparent from the figures given, the improvement in image resolution is substantial and leads to significantly greater clarity of detail in the reproduced image. The improved tube definition thus obtained also is of advantage in that it increases the range of the tube and enables it pick up and reproduce fields of view much more distantly spaced from the tube.

Still another desirable result stems from the fact that satisfactory operation of the image tube is less critically dependent on the dimensions and placement of its components and on the response characteristics of the photoemissive and fluorescent materials used in its fabrication, which significantly lowers the percentage of manufacturing rejects and, accordingly, the cost per usable tube. Thus, in one tube design well over half the tubes manufactured may fail to meet image quality standards if operated at 20,000 volts, but very few if any fail to meet minimum standards if operated at 40,000 volts.

The maximum power supply voltage feasible for use with image tubes is limited by corona effects which occur in the presence of high potential gradients along the tube walls and high potential differences between the tube, its electrical connections and surroundings. Corona disturbs the electrostatic focusing and accelerating fields within the tube, hence its presence seriously detracts from tube definition and image stability. Since at supply voltages over 20,000 volts and with image tube housings and electrical connections of the type heretofore used it has not been possible to eliminate corona, I have developed the improved and corona resistant tube housings and electrical lead arrangements now to be described, which permit use of power supplies to and above the 35,000–40,000 volt range at which best image resolution and image stability are obtained.

With reference again to the drawings, the image tube 10 is shown mounted within a housing 25 in accordance with the invention. Housing 25 comprises a generally tubular metal casing 27 one end of which is closed by a lens mount 29 carrying a low power lens 31 the purpose of which is to correct for the curvature of photocathode 14 of image tube 10 and to properly focus the optical image thereon. Lens 31 is held in mount 29 in sealed relation thereto as by a synthetic rubber seal ring 33 or the like compressed against the lens by retainer rings 35. Lens mount 29 is externally threaded as at 37 to engage in an adaptor ring 39 fixed in the end of casing 27 as by lock ring 41. A seal ring 43 of synthetic rubber or similar material compressed into the threaded joint between lens mount 29 and adaptor ring 39 as by retainer rings 45 seals this joint and completes the hermetic sealing of the left-hand end of casing 27 as shown.

Lens mounting ring 29 may have its inner end flanged as at 47, and an annular static shield 49 bears against the flange 47 and may if desired be welded or otherwise fixed thereto. The photocathode end of image tube 10 rests against shield 49, a fabric or other mechanical shock absorbent cushion 51 being interposed between the shield and image tube.

The viewing end of casing 27 is closed by a hollow, generally cylindrical body 53 of a material having high dielectric strength such, for example, as "Bakelite," polystyrene and other plastics or a ceramic such as steatite or the like. The nonconductive body 53 is clamped in casing 27 as by clamping means comprising a clamp ring 55 inwardly flanged at one end to engage an outwardly extending flange on casing 27 as at 57, and threaded at its other end to receive a lock ring 59 which may be turned down to firmly clamp the body 53 in casing 27 and sealed thereto as by seal ring 61.

An eyepiece lens 63 is received in a through opening in the body 53 and held therein by threaded retainer ring 65. A seal ring 67 may be provided to seal between the lens and its mounting.

Image tube 10 is cradled within the insulator body 53 with its target screen end abutting against the bottom of a generally circular section recess 69 in the insulator body, rubber rings 71 and 73 being positioned between the tube end and the body to prevent transmission of mechanical shock therebetween. The central portion of image tube 10 is enclosed within a rubber ring 75 clamped within a split ring 77 which may be of the same material as the insulator body 53 and formed with oppositely directed wedge surfaces as shown. These surfaces coact with similar surfaces on body 53 and on an axially movable ring 79 of insulating material spring-loaded against split ring 77 as by springs 83 spaced about the movable ring 79 and held compressed against it by screws 81. The split ring 77 thus is firmly clamped about ring 75 and image tube 10, to maintain the tube properly in position and at the same time to provide shock absorbing mounting therefor.

The lead wires from the focusing electrode, photocathode and target screen of image tube 10 are as shown at 90 in Figure 1 brought out through the wall of the tube and electrically connected to metal contact buttons 85, 86 and 87, respectively, bonded to the exterior of the tube envelope as by a setting adhesive having good electrical resistance properties. The adhesive, which may be a thermosetting plastic, for example, is also applied around the contact button edges and up onto the outer portions of the button tops as at 89 (Figure 2), in thickness sufficient to minimize the possibility of corona at the contact button edges. The exposed surfaces of the contact buttons preferably are highly polished to prevent corona effects over these surfaces.

A hole 91 drilled or otherwise formed in insulator body 53 has slidably received therein a pair of oppositely directed plungers 93 and 95, urged one against the metal of casing 27 and the other against contact button 85 by a spring 97 compressed therebetween. Casing 27 is as indicated in Figure 2 normally grounded during image tube use, hence the electrical connection between the casing and focusing electrode contact button 85 provided by plungers 93 and 95 is effective to ground the focusing electrode.

Electrical connection to the image tube target screen is provided by a plunger 99 which is urged, by spring 100, against contact button 87. Spring 100 is held compressed against plunger 99 as by a metal disc member 101 press-fitted or otherwise fixed in insulating body 53, and is electrically connected by the disc member to a lead wire 103 which extends to the exterior of insulator body 53 and casing 27 through a bore 105 drilled or otherwise formed therein. Lead wire 103 may be insulated from casing 27 at the point at which it passes therethrough as by a large insulating plug 107 fitted in bore 105.

It will be noted that the lead wire and contact arrangement just described provides three seals between the hollow interior of insulating body 53 and atmosphere, one being formed by plunger 99, another by disc 101, and a third between the lead wire and the bores in body 53 and plug 107 through which the wire passes.

The electrical connection means for photocathode contact button 86 comprises a resilient plastic rod 109 formed about a lead wire 111 and bonded or otherwise sealed at one end in a bore in insulating body 53. A spherical metal contact 113 on the end of lead wire 111 is exposed through a cut out portion at the free end of rod 109 and is firmly pressed against photocathode contact button 86 by the resiliency of the rod, thus providing good electrical connection between the lead wire and photocathode. Lead wire 111 extends to the exterior of the tube housing through a bore 115 and insulator plug 117 similar to those described in reference to lead wire 103.

Preferably, the metal of plungers 93, 95 and 99 and spherical contact 113 is highly polished to minimize corona effects at the surfaces of these elements.

The interior of tube housing 25 is, as is apparent from the foregoing, hermetically sealed against entrance of moisture, dust or other agent conducive to corona. The air or other atmosphere within the housing may be dehumidified and maintained free of moisture as by a suitable dessicant placed in a chamber 118 formed in insulator body 53 and open to the housing interior through an apertured plug 119, or the dessicant may if desired merely be inserted loose in the housing as through a bore 121 which is closed by a threaded plug 123 and sealed by O-ring 125.

Ground connection may conveniently be made to metal casing 27 by a bolt member 127 threaded into the casing clamp ring 55. Bolt member 127 by its engagement in slot 129 in insulator body 53 also serves to properly align the body 53 and ring 55 for insertion of insulating plugs 107 and 117 into the bores provided therefor in these members.

The image tube and housing described in the foregoing are adapted to use with any conventional optical objective for focusing the desired field of view onto the photocathode of image tube 10. The Schmidt objective illustrated in phantom lines in Figure 1 and comprising the usual spherical mirror 131, corrector plate 133, plane mirror 135 and casing 137, is one of the several objectives suitable for use in this application.

Referring now to Figure 6, there is illustrated a telescope providing even further improved image resolution and includes principally the Schmidt objective or equivalent image forming system with image converter tube 139, which may for example be the apparatus described above, suitably mounted wholly within telescope housing 141 with the photocathode positioned in the focal plane of the telescope and a sighting piece secured to one side of telescope housing 141 thereby eliminating the use of plane mirror 135 of Figure 1 and obviating its attenuating effect on the signal image. The image converter tube 139 is preferably the one described in connection with Figures 1 through 5 with the infra-red receiving end 153 corresponding to end 29 in Figure 1 facing reflecting surface 155. The electronically produced visible image is transmitted to the exterior of the telescope by means of prism 143 directed to opening 144 in housing 141 to be available outside of the housing at a position intermediate the ends of the telescope housing.

Suitable lenses, as illustrated at reference numeral 145, are used in conjunction with objectives 147, prisms 149 and eye pieces 151 to provide additional magnification of the desired image after its transformation into a visible image by converter tube 139. Prisms 149 are provided to display the image in a direction relative to the observer similar to the direction from which the actual image is observed so that movement of the telescope can be readily manipulated by the observer to follow movement of objects under observation. Thus the telescope as here constructed provides binocular vision of large magnifying power and has a far shorter axial dimension than has a corresponding telescope assembled axially as shown in Figure 1 modified to incorporate the additional image magnifying elements without utilizing the double bent sighting piece.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In radiant energy sensitive apparatus including an electro-optical tube having elements requiring high voltage supply, a housing for said tube comprising a generally tubular casing, an insulator body received in an end of said casing to close and seal said casing end and having a longitudinally extending recess therein opening into the casing interior and receiving at least a portion of said electro-optical tube in supporting and insulating relation in said recess, at least one electrical lead extending through said insulator body and into the casing interior for electrical connection to at least one of said tube elements, a radiant energy transparent window member mounted to the end of said casing opposite said insulator body to close and hermetically seal the casing interior against contamination of its atmosphere by agents conducive to corona, said electro-optical tube being clamped in said insulator body recess by a split ring positioned between said insulator body and an axially movable ring member spring loaded to urge the split ring in the direction of said body, said split ring and at least one of said insulating body and movable ring member including wedge surfaces coacting to compress the split ring about the tube and maintain it firmly in position with respect to the insulator body.

2. A radiant energy sensitive device comprising an electro-optical tube envelope having a photocathode and fluorescent target screen at opposite ends thereof for converting infrared radiation into visible radiation; an outer housing comprising a generally tubular casing; a window member mounted to said casing to close and seal one end thereof; contacts on said tube envelope adjacent to the physical location of said photocathode and said target screen for applying operating potentials up to the order of 40,000 volts between said photocathode and said target screen; an insulator member having means for clampingly engaging said tube envelope at a position intermediate said ends positioned in said tubular casing with said photocathode adjacent said window member and the axes of said photocathode and said window in alignment; means for sealing the outer surface of said insulator member to the other end of said tubular casing; an eye-piece sealingly secured in said insulator member adjacent said target screen whereby the interior of said tubular casing is hermetically sealed; and electrical conductors connected at one end to said photocathode and said target screen respectively extending through said insulator member to separately spaced seal plugs in said tubular housing adapted to be connected to a source of operating potential.

3. A radiant energy sensitive device comprising an electro-optical tube envelope having a photocathode and fluorescent target screen for converting infrared radiation into visible radiation; contacts on said tube envelope adjacent to the physical location of said photocathode and said target screen for applying operating potentials up to the order of 40,000 volts between said photocathode and said target screen; an outer housing for said tube envelope comprising a generally tubular casing; a window member mounted to said casing to close and seal one end thereof; a static shield secured to the inside of said tubular casing adjacent said window member; an insulator member having means for clampingly engaging said tube envelope in position intermediate said ends positioned in said tubular casing with said photocathode adjacent said window member to the inside said static shield; means for sealing the outer surface of said insulator member to the other end of said tubular casing; an eye-piece sealingly secured in said insulator member adjacent said target screen whereby the interior of said tubular casing is hermetically sealed; a pair of spaced seal plugs in said tubular housing; an electrical conductor extending through each of said seal plugs and through separate spaced channels in said insulator member to connect to said photocathode and said target screen contacts on said tube envelope respectively.

4. A radiant energy sensitive apparatus comprising a generally cylindrically-shaped image tube envelope having a photocathode at one end and a fluorescent target screen at the other end, buttonshaped contacts on said tube envelope adjacent said photocathode and said target screen, a cylindrically-shaped casing for said tube having a radiant energy transparent window member sealed in said casing at one end thereof, a static shield surrounding said window member and opening inside said casing, a tube envelope support sealed in said casing at the other end thereof comprising a cylindrical body of insulating material having an internal bore for receiving the target screen end of said tube envelope, means at one end of said cylindrical body for clampingly grasping said tube envelope intermediate its ends, a bore in said insulator body adjacent the buttonshaped contact on said tube envelope for said target screen, means including a spring biased plunger in said last mentioned bore for providing an electrical circuit from the exterior of said casing to said contact for said target screen, means for connecting operating potential to said buttonshaped contact for said photocathode, and an eye-piece lens mounted in a sealed relationship to the other end of said cylindrical body of insulating material through which said target screen is viewable.

5. The apparatus as defined in claim 4 wherein said means for connecting operating potential to said buttonshaped contact for said photocathode comprises a resilient insulated rod of electrical conducting material sealed at one end in said cylindrical body of insulating material and extending to the exterior of said casing, the other end of said rod being exposed through said insulation and positioned to press against the buttonshaped contact for said photocathode inside said static shield.

References Cited in the file of this patent
UNITED STATES PATENTS

| | | |
|---|---|---|
| 1,948,766 | Lyon | Feb. 27, 1934 |
| 2,058,941 | Arnhym | Oct. 27, 1936 |
| 2,586,392 | Sheldon | Feb. 19, 1952 |
| 2,683,816 | Bouwers | July 13, 1954 |
| 2,712,611 | Nyman | July 5, 1955 |

FOREIGN PATENTS

| | | |
|---|---|---|
| 685,725 | Great Britain | Jan. 7, 1953 |

OTHER REFERENCES

Zworykin et al.: "Photoelectricity and Its Applications," John Wiley and Son, Inc., New York, 1949, pages 171–416.